United States Patent [19]

Giatras et al.

[11] Patent Number: 4,701,345
[45] Date of Patent: Oct. 20, 1987

[54] PROCESS FOR APPLYING POLYMERIC COATINGS, AND RESULTING COATED ARTICLES

[75] Inventors: James L. Giatras, Spring City, Pa.; Warren G. Mang, Haddonfield, N.J.; Charles P. Marino, Philadelphia; Michael C. Needling, Audubon, both of Pa.; George F. Pezdirtz, Lanham, Md.

[73] Assignee: Markel Corporation, Norristown, Pa.

[21] Appl. No.: 838,593

[22] Filed: Mar. 11, 1986

[51] Int. Cl.$^4$ ............................................. B05D 3/02
[52] U.S. Cl. .................................. 427/45.1; 427/397.7
[58] Field of Search ................ 427/45.1, 387, 397.7; 219/10.55 A, 10.61 R

[56] References Cited

U.S. PATENT DOCUMENTS

| | | | |
|---|---|---|---|
| 3,583,882 | 6/1971 | Bartrug | 427/45.1 |
| 3,619,252 | 11/1971 | Roscher | 427/45.1 |
| 3,861,945 | 1/1975 | Hartzell | 427/53.1 |
| 3,930,076 | 12/1975 | Kliment | 427/397.7 |

*Primary Examiner*—John H. Newsome
*Attorney, Agent, or Firm*—James Albert Drobile

[57] ABSTRACT

An improved process for coating an inert substrate, such as braided glass fiber sleeving and inert substrates of other materials and shapes, wiht a polymeric material such as a polyacrylate, a polyvinyl chloride, a silicone rubber, or a polyfluorocarbon, said method comprising the steps of: formulating an emulsion of the polymerizable material in water or other suitable polar phase; thickening the emulsion through the addition of an inert, finely-divided, particulate, hydrophilic inorganic oxide substance to a viscosity in the range of from about 35,000 to about 500,000 centipoises; applying the thickened emulsion in the form of a uniform coating of desired thickness to the sleeving or other inert substrate; passing the coated substrate through a microwave energy chamber and subjecting the thickened emulsion coating to microwave energy of a frequency, at a power density, and for a peirod of time sufficient to substantially devolatilize, or dry and coalesce, said emulsion; and subjecting the devolatilized coating to thermal energy at a temperature and for a period of time sufficient to substantially complete polymerization.

A braided glass fiber sleeve, or inert substrate of other configuration or material, containing a surface coating of a polymer, such as a polyacrylate, a polyvinyl chloride, a silicone rubber, or a fluoropolymer, such coating having substantially uniformly distributed therethrough very finely-divided particles of a chemically inert, hydrophilic, inorganic oxide, such as fumed silica, precipitated silica or aluminum oxide.

4 Claims, 1 Drawing Figure

PROCESS FOR APPLYING POLYMERIC COATINGS, AND RESULTING COATED ARTICLES

BACKGROUND OF THE INVENTION

1. Field of the Invention

The invention relates to the application of dielectric, thermal insulation and other polymeric coatings to electrical cable protective sleeving and other inert solid substrates, and to the resulting coated articles.

2. Discussion of the Prior Art

In electrical cable and conduit the conductor commonly is surrounded by a protective or reinforcing braided glass fiber sleeve which has been externally coated with a suitable polymeric material such as a polyacrylate, a polyvinyl chloride, a fluoropolymer, a silicone rubber, or the like. This polymeric coating, in some instances in conjunction with the inert substrate, serves as a dielectric and/or thermal insulator, and when colored may also serve as an identifier.

The polymeric coating is applied to the glass fiber sleeving or other inert substrate initially in the form of an aqueous emulsion of the polymerizable pre-polymer or monomer, and then the polymerizable material is cured or polymerized in situ through the application of heat to the coated sleeving. However, before final polymerization or curing of the monomer or prepolymer, the water in the aqueous emulsion coating must be substantially removed, i.e., the emulsion coating must be dried and coalesced, or "devolatilized," so that polymerization will produce the desired physical and chemical results. Care must be taken in this devolatilization step to avoid conditions which would result in imperfections in the polymer coating and lead to the ultimate dielectric or thermal breakdown of the product in its end use. The avoidance of such conditions requires careful control particularly over the rate at which the water is removed in the devolatilization phase.

Devolatilization heretofore typically has been accomplished by passing the emulsion-coated sleeving or other substrate through an elongated electric, or gas- or oil-fired, hot-air devolatilization oven. Limitations on rate of water removal, and therefore on temperature, in the devolatilization zone necessitate a substantial residence time in the oven. Also, and particularly in the case of coated sleeving products intended to have high dielectric or thermal insulation quality, it may be necessary to apply the total coating in several separate layers, each of which must be devolatilized in separate passes through the oven. The necessary high residence time in the oven in turn requires either that the oven be of extreme length or that the coated substrate be subjected to several passes through the oven. Thus, the devolatilization oven may be a single-pass oven or a multiple pass oven, but multiple coat, multiple pass ovens are more common because they are smaller and less costly to construct. After dewatering, the dry coated substrate enters a suitable curing oven or zone, in which the coated substrate is heated in order to complete polymerization of polymerizable or otherwise reactive material in the coating.

From the foregoing description it is apparent that conventional devolatilization processes are expensive and have other serious drawbacks.

OBJECTS OF THE INVENTION

It is an object of the present invention to provide an improved process for devolatilizing aqueous and other emulsions of monomers and prepolymers used in forming dielectric, thermal insulation and other polymeric coatings on inert solid substrates, in which microwave energy is substituted for thermal energy as the devolatilization energy source.

Another object of the invention is to provide an improved process for the devolatilization of such emulsions, utilizing microwave energy, in which a suitable thickening agent is added to the emulsion to prevent blistering in the coating during devolatilization.

Still another object of the invention is to provide an improved process for applying dielectric, thermal insulation, and other polymeric coatings on inert solid substrates, in which a very substantially increased rate of devolatilization is achieved with consequent reduction in devolatilization chamber size and saving in the energy cost of the devolatilization step.

A concomitant object of this invention is to provide, as a novel article, a coated article having a polymeric coating in which very finely-divided particles of an inert, hydrophilic thickening agent, consisting of an inorganic oxide, are substantially uniformly distributed therethrough.

SUMMARY OF THE INVENTION

The invention overcomes the shortcomings of conventional devolatilization techniques, through the use of microwave energy rather than thermal energy to devolatilize the emulsion of polymeric material coated on an inert solid substrate. This use of microwave energy permits of a much smaller and less energy-expensive devolatilization chamber. Conventional microwave energy technology is employed, including conventional magnetrons which produce microwave energy at safe and cost-efficient energy levels and frequencies. Thus, one or more conventional magnetrons generating microwave energy at the common commercial frequency of approximately 2,450 megaHerz can conveniently be utilized. Wave guides, of a type which are well known in the art, may be used to distribute the microwave energy more uniformly throughout the microwave energy chamber. The dimensions of the waveguide are multiples of one-half wavelength, in order to maximize propagation of the selected frequencies.

However, and most significantly, it has been found that the use of microwave energy to devolatilize an aqueous or other emulsion coating is not sufficient by itself. Thus, experimentation has shown that simply substituting microwave energy for thermal energy to devolatilize such coatings produces blistering and other imperfections in the coating and a lack of uniformity that impairs the dielectric or other properties of the coating and makes the coated article commercially unsatisfactory. Surprisingly, it has been found that the use of certain inert inorganic oxides, as thickening agents, to increase the viscosity of the emulsion prior to its application as a coating, allows the emulsion to be devolatilized through the use of microwave energy according to the process of the invention without impairing the ultimate dielectric or other qualities of the end product. Accordingly, the invention includes as essential, the step of adding a suitable inert thickening agent to the aqueous or other emulsion of monomer or prepolymer and in an amount sufficient to increase the viscosity of the emulsion to a viscosity in the range of from about 35,000 to about 500,000 centipoises. The important or essential qualities of the inorganic oxide thickening agents found to be useful in the practice of this invention are their chemically inert, hydrophilic nature, and their very high surface area. A particularly desirable thickener is fumed silica, such as "AEROSIL" brand of fumed silica which is commercially available from DeGussa Corporation. Another suitable thickener is precipitated silica. Still another is aluminum oxide.

The process of the invention is applicable to the devolatilization of an aqueous or other emulsion of virtually any monomer or pre-polymer, the only limitation on the particular polymer to be formed in the process of this invention being that, in polymerizable form, it be subject to formulation as an emulsion with water or a polar solvent and/or solute phase which can be stimulated by microwave energy.

The invention also includes the coated article end product, in which finely-divided particles of an inert inorganic oxide material, such as fumed silica, precipitated silica or aluminum oxide, are incorporated in the polymeric coating.

It will be appreciated that, although specific examples of the practice of the invention are given herein, the invention maybe varied widely without departing from its spirit and scope. For example, other microwave energy power levels and frequencies, other thickening agents, and other polymers and polar emulsion solvent/solute phases may be used in addition to those disclosed herein and the conditions of their use may be varied significantly within the disclosed ranges. In addition, although the invention is particularly disclosed as being suitable for use in devolatilizing coatings on braided glass fiber sleeving material, it also is within the purview of this invention to apply the process to the devolatilization of aqueous or other monomer and pre-polymer emulsions when used to coat inert solid substrates of other organic fiber compositions such as polyesters and aramids, and of other configurations such as tapes or profiles. It is to be noted that, although the invention is particularly adapted to the production of dielectric coatings for electrical cable and thermal insulators, it also may be used in connection with other polymeric coatings formed from an aqueous or other emulsion such as coatings used for color or other identification, thermal insulation or abrasion resistance.

DETAILED DESCRIPTION OF THE DRAWING

Figure 1:
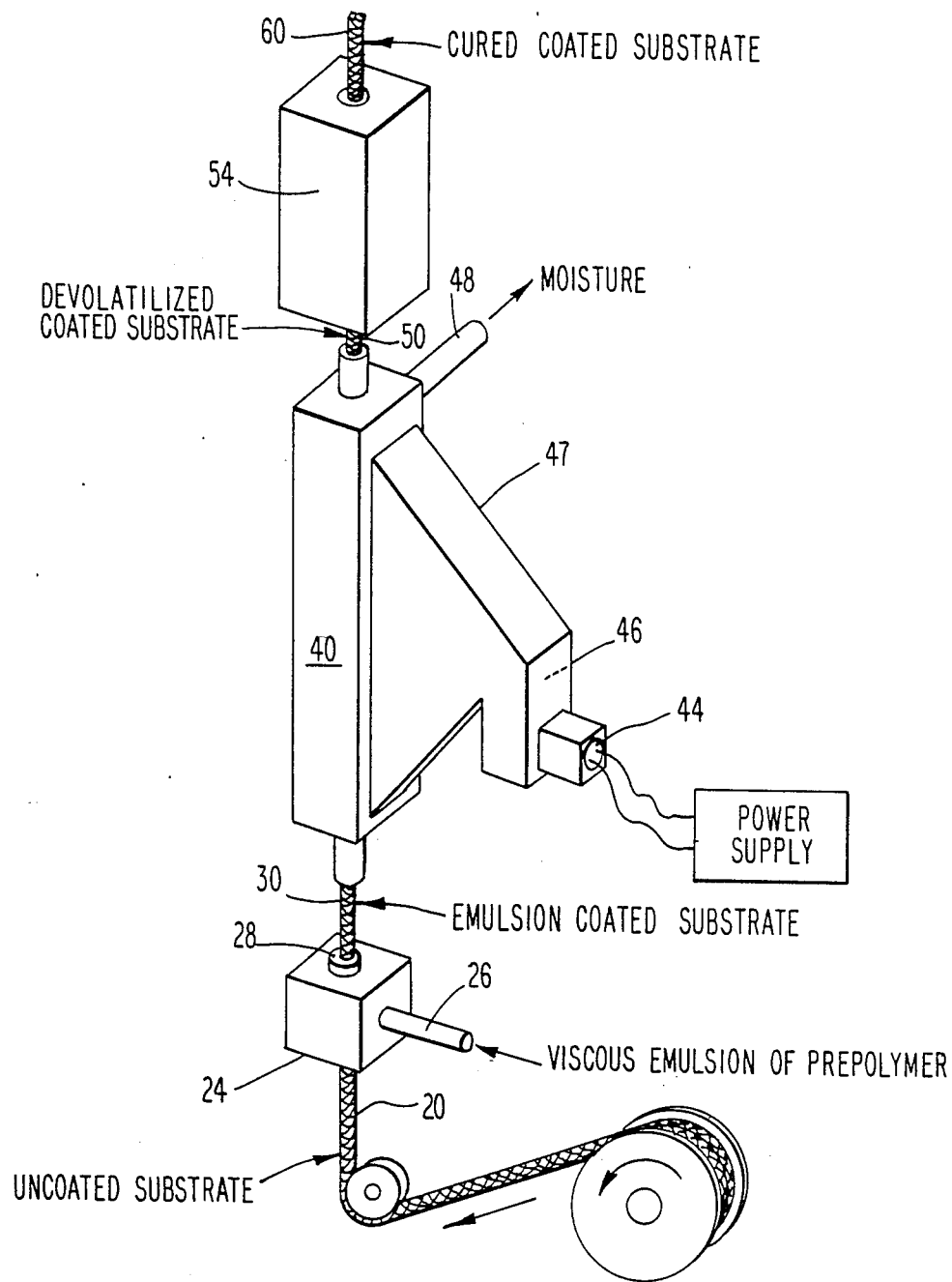

FIG. 1 is a schematic representation of the process of the invention.

DETAILED DESCRIPTION OF THE INVENTION

Viewing the drawing, in which a specific and preferred embodiment of the invention is illustrated, an inert substrate 20, such as a braided sleeve of glass fiber or similar material which is intended for use as a protective sleeve for electrical cable, is continuously fed into and through a suitable coating head 24. The braided sleeve, and its method of manufacture and use in the fabrication of a dielectrically coated electrical cable or conduit are generally well known in the art. The details of creating braided or other sleeving products from glass fiber and other high temperature and dielectric materials for electrical and thermal insulation purposes is well known in the art, and forms no part of this invention.

Suitable monomers or prepolymers, such as those of polyacrylates, polyvinyl chlorides, silicone rubbers and fluoropolymers, which are used to create dielectric coatings for electrical cable are formulated into an aqueous or other suitable emulsion in a manner which is generally well known in the art. Typically, such an emulsion will contain from about 40 to about 60 percent by weight of water or other suitable polar solvent and/or solute. To that emulsion is then added a very finelydivided, solid, inert inorganic oxide thickening agent, which preferably is fumed silica, but which also may be precipitated silica or aluminum oxide. The thickening agent is added to the emulsion using a suitable mixer, in a manner which is well known in the art, until the thickening agent is substantially uniformly dispersed throughout the emulsion, and the emulsion has achieved a viscosity in the range of from about 35,000 to about 500,000 centipoises. The essential characteristics of an inorganic oxide thickening agent that is suitable for use in the practice of the invention are that it be chemically inert, that it be hydrophilic, and that it have a very large surface area, viz., in the range of from about 100 to about 400 square meters per gram.

The aqueous or other suitable emulsion of a monomer or pre-polymer, thickened as above described, is then applied, in a uniform coating having a desired thickness in the range from about 0.1 mil to about 20 mils, over a suitable inert substrate such as a braided sleeve of glass fiber or other suitable material. The thickened monomer or pre-polymer emulsion is conveniently supplied by conventional pumping means through conduit 26 and into coating head 24, where it is applied as a uniform coating of desired thickness to the external surface of travelling substrate 20. A die and mandrel 28, positioned in coating head 24, determines the thickness of the coating applied to the travelling substrate 20. The emulsion coated substrate 30 which exits the coating head 24 is then continuously transported to and into devolatilization chamber 40.

In the devolatiliztion or microwave energy chamber 40 there is located one or more conventional microwave generators, or magnetrons, 44. When more than one magnetron is utilized, they may be mounted at right angles to each other in order to provide a more uniform distribution of microwave energy in the chamber. Each of the magnetrons 44 has a power rating sufficient to provide a suitable power density (power per unit of chamber volume) in the microwave energy chamber, and produces microwave energy having a frequency sufficient to excite water molecules, i.e., of 915 megaHerz. The magnetrons of choice are state of the art magnetrons, which are safe, reliable, commercially availble and reasonably price. A 2,450 megaHerz frequency is particularly useful, because it is approved by the FCC as a standard for home cooking microwave ovens. However, magnetrons of varying and variable power levels and producing other frequencies of microwave energy may be used within the purview of this invention.

The microwave energy chamber 40 is fabricated from an electrically conductive material, such as aluminum, and is adequately shielded to prevent the emission of stray microwave energy. In one specific and preferred embodiment chamber 40 has a vertical length of eight feet and a transverse cross section of four inches by four inches and is tightly fitted and sealed to avoid dissipation and escape of microwave energy. The specific shape, size and dimensions of the chamber 40 can be varied widely within the purview of the invention, so long as there is a sufficient level and substantially uniform distribution of microwave energy throughout the chamber for devolatilization of the monomer or prepolymer emulsion. In order to achieve more efficient distribution of the microwave energy through the chamber cavity, conventional internal wave guides 46 (not shown), which may be fabricated from cold rolled steel, can conveniently be located in horn 47 at distances from each other which are multiples of between one-half and one wavelength, in order to maximize propagation of the selected frequency. In the illustrated embodiment, horn 47 is triangular in side cross section. with a base length of 3½ feet, a height of 2 feet and a depth of 3½ inches. As indicated, the magnetron 44 is mounted near the apex of horn 47.

It also is necessary to keep the temperature in devolatilization chamber 40 relatively low, in the range of from about 32° F. to about 120° F., depending on the nature of polymerizable material being devolatilized, in order to avoid significant initiation of polymerization before substantially all of the water is driven off. If premature polymerization occurs, the coating is not satisfactory and the dielectric properties are not uniform.

Moist air containing water removed from the emulsion coating is evacuated from a suitable port 48 in the upper region of microwave energy chamber 40, and the devolatilized coated substrate 50 exits the devolatilization chamber 40 and enters curing oven 54.

In a specific and preferred embodiment of the invention, size 12 braided glass fiber sleeving containing a 10 mil thick coating of an acrylic monomer or prepolymer was satisfactorily devolatilized in a single pass through a microwave energy chamber 40 eight feet in length, while traveling at a rate of forty-two feet per minute. The aqueous emulsion of resin had uniformly dispersed therethrough very finely-divided particulate fumed silica, specifically that available commercially as "AEROSIL 200" silica, to produce a coating having a viscosity of about 250,000 centipoises before application. At the stated throughput, the residence time in the devolatilization chamber is about one-tenth as long as that typically necessary in a conventional prior art dewatering process, which would either require five passes through an eight-foot oven or an oven approximately forty feet in length to achieve a comparable result. The speed of the throughput can be varied, depending upon the particular characteristics and components of the microwave energy chamber, such as the size and number of magnetrons, and the nature of the emulsion being devolatilized, so that the minimum residence time in the chamber can be achieved.

The dewatered coated filament 50 leaving the devolatilization chamber 40 is immediately and continuously fed into and through a curing oven 54, which is an infrared oven or a hot-air oven fired by gas, electricity or oil, where the coated substrate is heated at a temperature in the range of from about 275° F. to about 300° F. for a period of one to two minutes in order to achieve substantially complete polymerization. The construction, operation and other details of the curing oven 54 are well known in the art and do not form a part of this invention. The finished product 60 exits the curing oven 54 and is subjected to dielectric testing to make sure that curing has been completed, and that the dielectric coating is not flawed. The coated material is then wound on a suitable spool for subsequent handling.

It will be seen that the process of the invention is a continuous process, and produces a dielectric, thermally insulated, or other coated braided sleeving having good, uniform dielectric or other properties and a substantially uniform and even coating, and having substantially uniformly distributed throughout the polymer, finely-divided particles of fumed silica or precipitated silica in a concentration in the range of from about 2 to about 8 percent by weight, and having an average particle size in the range of from about 5 to about 20 millimicrons.

The monomers and pre-polymers which may be used in this invention may vary widely, but in making typical coated braided sleeving, would be acrylics, vinyls, silicone rubbers, fluorocarbons and the like. It is understood that other materials, such as a suitable colorant, can be added to the aqueous monomer or prepolymer emulsion, in a manner which is also well known in the art. The aqueous or other emulsion, which preferably is coated on suitable braided sleeves of glass fiber material or other inert substrate through the use of a mandrel and die configuration in a manner which is well known in the art, also may be applied to other types of substrates in accordance with the practice of the invention. However, in order to achieve the optimum properties of coatings desired, it is necessary to carefully control the thickness of the applied coating, through controlling the design of the coating head 24. In the practice of the invention, it is preferable to apply the coating with a thickness in the range from about 0.1 mil to about 20 mils.

Preferably, the coating application, devolatilization and curing steps of the process are continuous, in the manner shown in FIG. 1.

In a specific example of the application of the invention, an aqueous emulsion is prepared, using 2,000 grams of "HYCAR 2679", an acrylic latex produced by the B. F. Goodrich Company, and an approximately equal weight of water. The aqueous emulsion thus contains about 50% solids. To this emulsion is added 52.5 grams of "AEROSIL 200", a 100% solid fumed silica produced by DeGussa Corporation, and having an average particle size of approximately 12 millimicrons and a surface area of 200±25 square meters per gram. These components are dispersed by a Cowls dissolver operating at 2,400 RPM for five minutes, and then are degassed by drawing a vacuum of more than twenty-five inches of mercury, in a manner which is generally well known in the art. The thickened emulsion has a viscosity of 250,000 centipoises. This emulsion is then continuously applied, in a thickness of approximately 10 mils, utilizing a suitable die and mandrel coating apparatus, to a braided "FIBERGLAS" glass fiber sleeve substrate. The emulsion coated substrate is continuously passed through the microwave energy chamber described above, using two 2,450 megaHertz, 750 watt Hitachi magnetrons positioned in different planes and at right angles to each other, at a rate of forty-two feet per minute, with a chamber temperature of about 100° F. Upon exiting the microwave energy chamber, the substantially devolatilized coated substrate enters and traverses a standard curing oven, with radiant heat and an oven temperature of approximately 600° F., and a length of approximately 18 feet. Upon exiting the curing oven, the resulting product, which is found to have a highly uniform dielectric property, is rolled on suitable spools. The speed of travel of the substrate is maintained constant at about forty-two feet per minute.

Although the invention is particularly applicable to the devolatilization of dielectric polymeric coatings for electrical cable, using braided glass fiber sleeving and similar substrates, it will be appreciated that the principles of the invention can be used to devolatilize polymeric materials on other types and shapes of inert substrates, for example, flat substrates such as tapes, or even profile-shaped substrates.

The invention includes the novel coated articles which are produced by the process of the invention, which articles are inert substrates with polymeric surface coatings having substantially uniformly distributed therethrough a finely-divided particulate chemically inert hydrophilic inorganic oxide material selected from the group consisting of hydrophilic fumed silica, hydrophilic precipitatd silica and aluminum oxide, having a very large surface area. These thickening agents facilitate devolatilization of the emulsion coating without deleteriously affecting the dielectric or other electrical, physical or chemical properties of the coated product.

It will be appreciated that what has been described is a specific or preferred embodiment of the invention, and that the specific conditions of operation of the process can be varied greatly without departing from the spirit or scope of the invention. For example, the particular frequencies of the magnetrons, the power level of the magnetrons, the details of the wave guides, the size and configuration of the microwave energy chamber and the throughput all can be varied, depending upon the polymeric coating material and the thickness of the coating, so long as the desired rate of devolatilization is achieved.

The invention claimed is:

1. A process for applying a coating of a polymeric material to an inert solid substrate, said process comprising the steps of:
  (a) Preparing an emulsion of the polymerizable material;
  (b) Adding to said emulsion a thickening agent consisting of a finely-divided, solid, inert, hydrophilic inorganic oxide material in an amount sufficient to thicken said emulsion to a viscosity in the range of from about 35,000 to about 500,000 centipoises;
  (c) Applying a coating of the thickened emulsion to said substrate;
  (d) Subjecting the emulsion coating on said substrate to microwave energy of a frequency sufficient to excite the molecules of the non-polymerizable emulsion phase and at a microwave power density and for a period of time sufficient to substantially devolatilize said emulsion coating; and
  (e) Subjecting the devolatilized emulsion coating to thermal energy to complete polymerization.

2. A process as set forth in claim 1, wherein said inorganic oxide thickening agent is selected from the group consisting of fumed silica, precipitated silica, and aluminum oxide, and has a surface area in the range of from about 100 to about 400 square meters per gram.

3. In a method for applying a coating of a polymeric substance to an inert solid substrate, said method including the steps of preparing an emulsion of the monomer or pre-polymer in polymerizable form, applying a coating of said emulsion to said substrate, subjecting the coated substrate to thermal energy to devolatilize the coating, and subjecting the article including the substrate and the devolatilized coating to additional thermal energy in order to cure the polymerizable material, the improvement which comprises (1) incorporating in said emulsion, prior to coating, an inert, finely-divided, solid hydrophilic inorganic oxide material in an amount sufficient to thicken the emulsion to a viscosity in the range of from about 35,000 to about 500,000 centipoises; and (2) subjecting the substrate coated with the thickened emulsion to microwave energy of a frequency sufficiently high to excite the molecules of the non-polymerizable emulsion phase, and at a microwave power density and for a period of time sufficient to substantially devolatilize the coating.

4. Method as set forth in claim 3, wherein said inert, finely-divided, solid hydrophilic inorganic oxide material is selected from the group consisting of fumed silica, precipitated silica, and aluminum oxide.

* * * * *